United States Patent
Chang et al.

(10) Patent No.: US 8,912,744 B2
(45) Date of Patent: Dec. 16, 2014

(54) METHOD AND APPARATUS FOR DYNAMICALLY ADJUSTING A DEAD TIME OF BRUSHLESS DIRECT CURRENT MOTOR DURING A PHASE CHANGE

(75) Inventors: Haó-Yu Chang, New Taipei (TW); Pei-Cheng Huang, Taipei (TW); Wei-Hsu Chang, New Taipei (TW); Kuo-Chung Lee, New Taipei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 89 days.

(21) Appl. No.: 13/570,973

(22) Filed: Aug. 9, 2012

(65) Prior Publication Data

US 2013/0038260 A1 Feb. 14, 2013

(30) Foreign Application Priority Data

Aug. 12, 2011 (TW) .............................. 100128875 A

(51) Int. Cl.
*H02P 6/00* (2006.01)
*H02P 6/08* (2006.01)
*H02P 6/14* (2006.01)
*H02P 7/00* (2006.01)

(52) U.S. Cl.
CPC ................ *H02P 6/085* (2013.01); *H02P 6/142* (2013.01); *H02P 2007/6305* (2013.01)
USPC ........................ 318/400.35; 318/802; 318/599

(58) Field of Classification Search
USPC ............ 318/400.35, 802, 599, 811, 805, 801, 318/806, 798; 363/41
See application file for complete search history.

(56) References Cited

U.S. PATENT DOCUMENTS 7,106,025 B1 * 9/2006 Yin et al. ...................... 318/811
2007/0030705 A1 * 2/2007 Yamamoto et al. .............. 363/41

* cited by examiner

*Primary Examiner* — Karen Masih
(74) *Attorney, Agent, or Firm* — Muncy, Geissler, Olds & Lowe, P.C.

(57) ABSTRACT

A method and apparatus for dynamically adjusting a dead time of a BLDC motor during a phase change detect the winding current of the BLDC motor during the dead time, and terminate the dead time when the winding current is detected to be substantially or close to zero. Thus, the method and apparatus can optimize the dead time and switch the BLDC motor between two phases at a zero-current point, without reducing the maximum rotation speed of the BLDC motor.

22 Claims, 8 Drawing Sheets

|    | First Phase | Dead Time | Second Phase |
|----|---|---|---|
| AH | PWM (Varying with Rotation Speed) | Low | Low |
| AL | $\overline{\text{PWM}}$ (Varying with Rotation Speed) | High/Low | High |
| BH | Low | Low | PWM (Varying with Rotation Speed) |
| BL | High | PWM with Minimum Off Time | $\overline{\text{PWM}}$ (Varying with Rotation Speed) |

Fig. 7

|  | First Phase | Dead Time | Second Phase |
|---|---|---|---|
| AH | PWM (Varying with Rotation Speed) | Low | Low |
| AL | $\overline{PWM}$ (Varying with Rotation Speed) | High/Low | High |
| BH | Low | PWM with Minimum On Time | PWM (Varying with Rotation Speed) |
| BL | High | $\overline{PWM}$ with Minimum Off Time | $\overline{PWM}$ (Varying with Rotation Speed) |

METHOD AND APPARATUS FOR DYNAMICALLY ADJUSTING A DEAD TIME OF BRUSHLESS DIRECT CURRENT MOTOR DURING A PHASE CHANGE

FIELD OF THE INVENTION

The present invention is related generally to a brushless direct-current (BLDC) motor and, more particularly, to a driving circuit and method for a BLDC motor.

BACKGROUND OF THE INVENTION

A brushless direct-current (BLDC) motor uses semiconductor switches to accomplish electronic phase changes, and thus has advantages, such as less mechanical wear and lower noise, as compared to a motor using a mechanical rectifier that is established by carbon brushes and commutators.

As shown in FIG. 1, a driving circuit for a BLDC motor 10 includes an H-bridge circuit, which is established by four MOSFETs Q1-Q4 that act as switches and have body diodes D1-D4, respectively, and has two output terminals A and B to be connected to the BLDC motor 10, a pulse width modulation (PWM) controller 12, which has four output terminals AH, AL, BH, and BL to provide PWM signals to control the MOSFETs Q1-Q4, respectively, to thereby generate an operational voltage as required between the output terminals A and B to adjust the winding current Im of the BLDC motor 10 and accordingly the rotation speed of the BLDC motor 10, and an over-current protection (OCP) circuit 14 connected between the H-bridge circuit and a ground terminal to detect the winding current Im for providing the system an over-load protection. When the winding current Im is so large to indicate that the system is at an over-load state, the OCP circuit 14 will signal the PWM controller 12 to stop providing the PWM signals, or to directly turn off the lower-side MOSFETs Q2 and Q4, thereby stopping the BLDC motor 10.

For the sake of convenient illustration, the MOSFETs Q1-Q4 are called the first upper-side switch, the first lower-side switch, the second upper-side switch, and the second lower-side switch, respectively. The driving process of the BLDC motor 10 is shown in FIG. 2. For example, as shown in FIG. 2(a), when the rotor of the BLDC motor 10 is at one of the phases, the PWM controller 12 maintains the second upper-side switch Q3 off and the second lower-side switch Q4 on, and alternatively switches the first upper-side switch Q1 and the first lower-side switch Q2 by a PWM signal, so that the winding current Im flows from the output terminal A through the BLDC motor 10 to the output terminal B; when the rotor is at another phase, as shown in FIG. 2(b), the PWM controller 12 maintains the first upper-side switch Q1 off and the first lower-side switch Q2 on, and alternatively switches the second upper-side switch Q3 and the second lower-side switch Q4, so that the winding current Im flows from the output terminal B through the BLDC motor 10 to the output terminal A. For the sake of convenient illustration, the phase depicted in FIG. 2(a) is referred to as the first phase, and that depicted in FIG. 2(b) is referred to as the second phase. When the BLDC motor 10 is switched between the first and the second phases, if the switch timing is not properly controlled, a phase-change surge current will occur due to the residual current Im in the windings of the BLDC motor 10 and thereby induce a reactive electromotive force to boost the voltage at the power input terminal Vin, as shown in FIG. 3 for example, which may damage corresponding components.

In order to prevent the voltage Vin from instantly being boosted during a phase change, a dead time is inserted when the BLDC motor 10 is switched between different phases, for the winding current Im to decay to zero before the BLDC motor 10 is switched from the current phase to the next phase. For example, referring to FIG. 4, to switch from the first phase to the second phase, during the dead time inserted therebetween, the PWM controller 12 maintains the second lower-side switch Q4 on and the other switches Q1-Q3 off, thereby establishing a current loop to allow the winding current Im to be consumed by the second lower-side switch Q4 and the body diode D2, or maintains the first lower-side switch Q2 and the second lower-side switch Q4 on and the other switches Q1 and Q3 off, thereby establishing a current loop to allow the winding current Im to be consumed by the first lower-side switch Q2 and the second lower-side switch Q4. However, the winding current Im varies with the rotation speed of the BLDC motor 10 and thus requires different time periods to decay to zero at different rotation speeds, i.e., different rotation speeds require different dead times. For instance, if the dead time is such set that the residual current Im can be completely consumed at the rotation speed of 50%, then for the rotation speed of 70%, the residual current Im will be still high enough to cause a phase-change surge current after the dead time terminates. On the contrary, if the dead time is set longer, the maximum rotation speed of the BLDC motor 10 will be adversely limited.

Therefore, it is desired a method and apparatus for dynamically adjusting a dead time of a BLDC motor during a phase change.

SUMMARY OF THE INVENTION

An objective of the present invention is to provide a method and apparatus for dynamically adjusting a dead time of a BLDC motor during a phase change.

Another objective of the present invention is to provide a method and apparatus for optimizing a dead time of a BLDC motor during a phase change.

A further objective of the present invention is to provide a method and apparatus for switching a BLDC motor between two phases at a zero-current point.

According to the present invention, the winding current of a BLDC motor during a phase change is detected, and the dead time for the phase change is terminated when the winding current is detected to be equal to or smaller than a zero-current threshold. Since the dead time is dynamically adjusted depending on the winding current, the dead time can be optimized and the phase can be switched at a zero-current point. In addition, since the dead time is dynamically adjusted, it will not reduce the maximum rotation speed of the BLDC motor, and is adaptive to BLDC motors of various rotation speeds.

In one embodiment, during a dead time, the lower-side switch that is conventionally maintained on will be temporarily turned off for the winding current to be detected.

In one embodiment, during a dead time, the lower-side switch that is conventionally maintained on will be temporarily turned off, and an upper-side switch at the same side of this temporarily turned off lower-side switch will be temporarily turned on during a time interval of temporarily turning off this lower-side switch, for the winding current to be detected.

In one embodiment, during a dead time, the lower-side switch that is conventionally maintained on will be temporarily turned off at regular time intervals, for the winding current to be detected.

In one embodiment, during a dead time, the lower-side switch that is conventionally maintained on will be temporarily turned off at regular time intervals, and an upper-side switch at the same side of this temporarily turned off lower-side switch will be temporarily turned on during a time interval of temporarily turning off this lower-side switch, for the winding current to be detected.

In one embodiment, during a dead time, the PWM controller applies a short pulse to temporarily turn off the lower-side switch that is conventionally maintained on.

In one embodiment, during a dead time, the PWM controller applies a short pulse to temporarily turn off the lower-side switch that is conventionally maintained on and turn on an upper-side switch at the same side of this temporarily turned off lower-side switch.

In one embodiment, during a dead time, a detection voltage is generated depending on the winding current under detection, and is then compared to a zero-voltage threshold for asserting a control signal to terminate the dead time when the detection voltage is equal to or greater than the zero-voltage threshold.

In one embodiment, a current detector detects the winding current during a dead time, and signals a PWM controller to terminate the dead time when the winding current is detected to be equal to or smaller than a zero-current threshold.

In one embodiment, the current detector includes a resistor for generating the detection voltage depending on the winding current during a dead time, and a comparator for comparing the detection voltage to the zero-voltage threshold to assert a control signal for the PWM controller to terminate the dead time.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which:

FIG. 7 is a timing diagram for the circuit shown in FIG. 5 during a phase change; and FIG. 8 is another timing diagram for the circuit in FIG. 5 during a phase change.

DETAILED DESCRIPTION OF THE INVENTION

Figure 5:
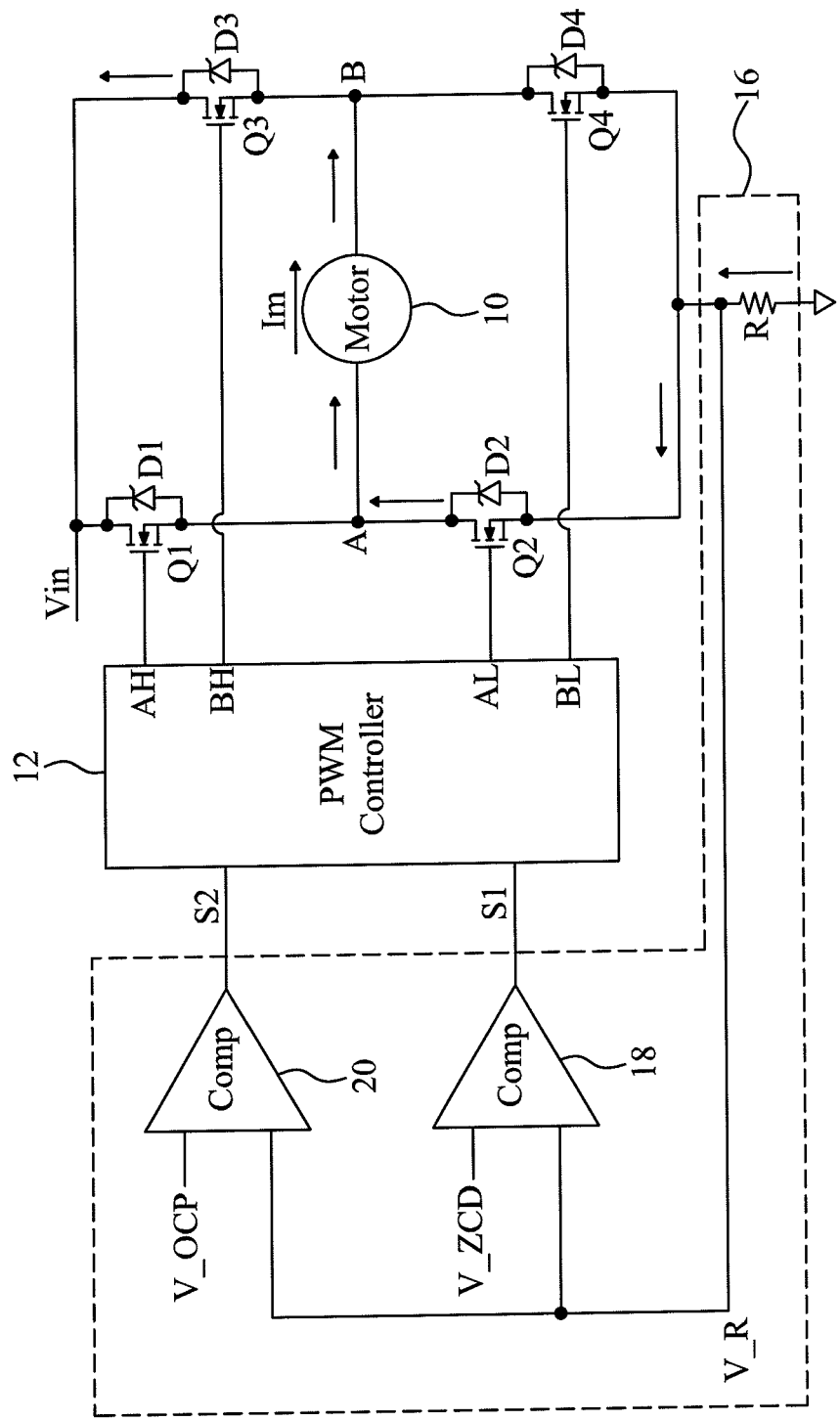
FIG. 5 is a circuit diagram of an embodiment according to the present invention.

To dynamically adjust a dead time of a BLDC motor 10 during a phase change, in an embodiment as shown in FIG. 5, an apparatus according to the present invention includes a current detector 16 connected to the H-bridge circuit and the PWM controller 12, to detect the winding current Im of the BLDC motor 10 during the dead time and to signal the PWM controller 12 to terminate the dead time when the winding current Im is detected to be substantially or close to zero. To determine a time point for the phase change, a zero-current threshold is set as a reference to indicate that the winding current Im is equal to or close to zero for the current detector 16. When the current detector 16 detects that the winding current Im is equal to or smaller than the zero-current threshold, it is confirmed that the operation of the next phase can be started. The zero-current threshold may be set with consideration to the tolerance for surge currents. If the zero-current threshold is set with a value larger than zero, a surge current may be induced at the beginning of the next phase, while a higher rotation speed will be achieved due to the shorter dead time. Preferably, the zero-current threshold is set to be slightly larger than zero. In an optimal case, a phase change with zero current can be achieved.

Figure 1:
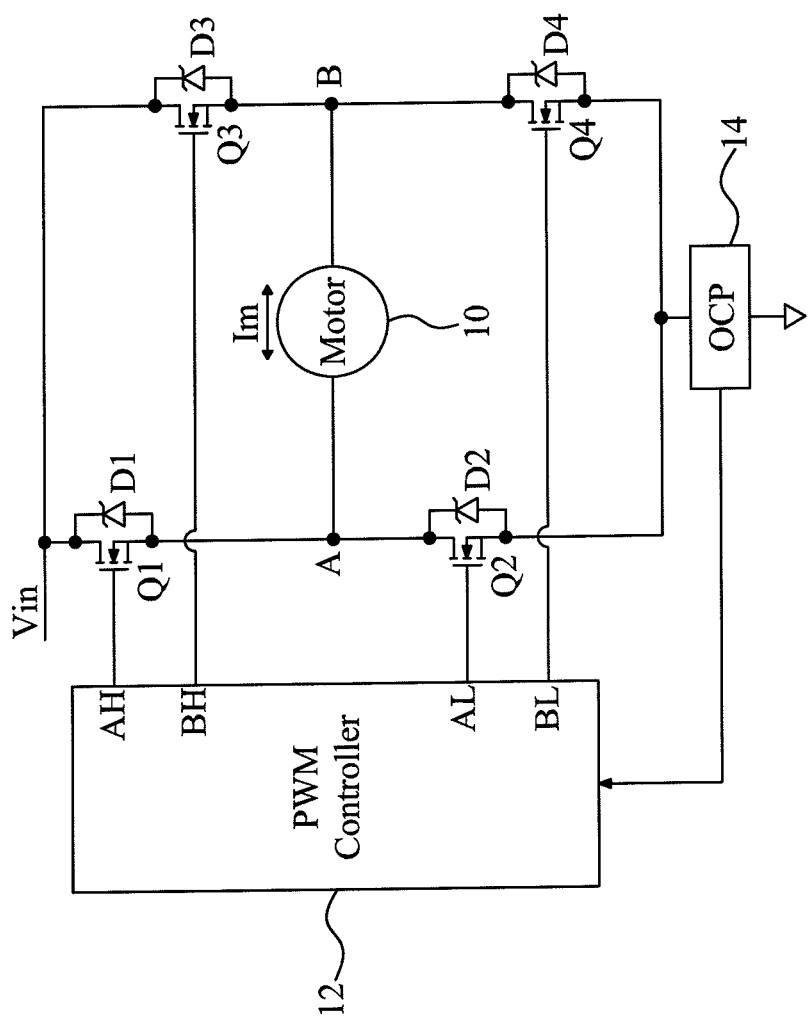
FIG. 1 is a circuit diagram of a conventional driving circuit for a BLDC motor.
Figure 2:
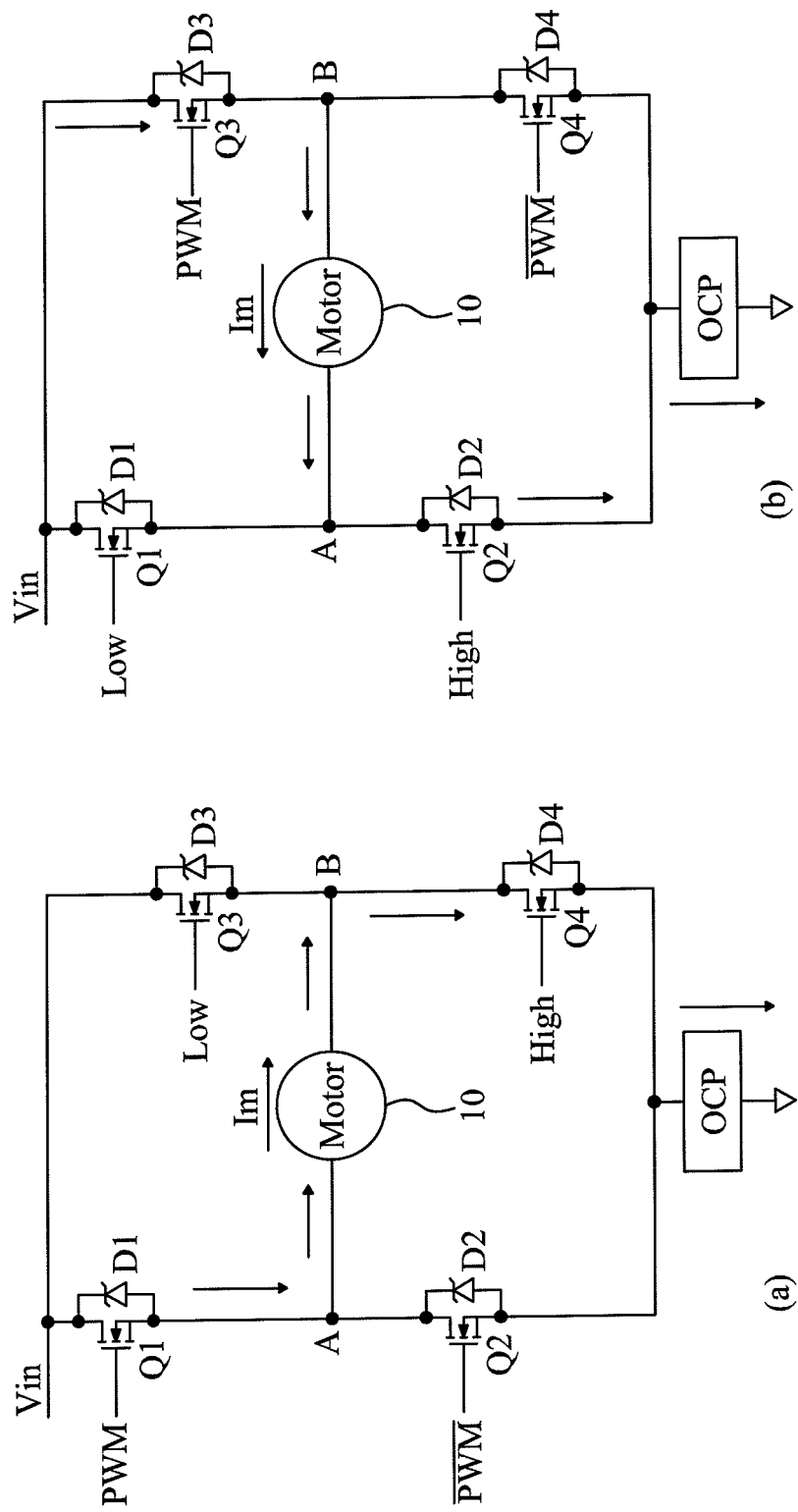
FIG. 2 is a diagram showing the current paths of a BLDC motor at two different phases.
Figure 3:
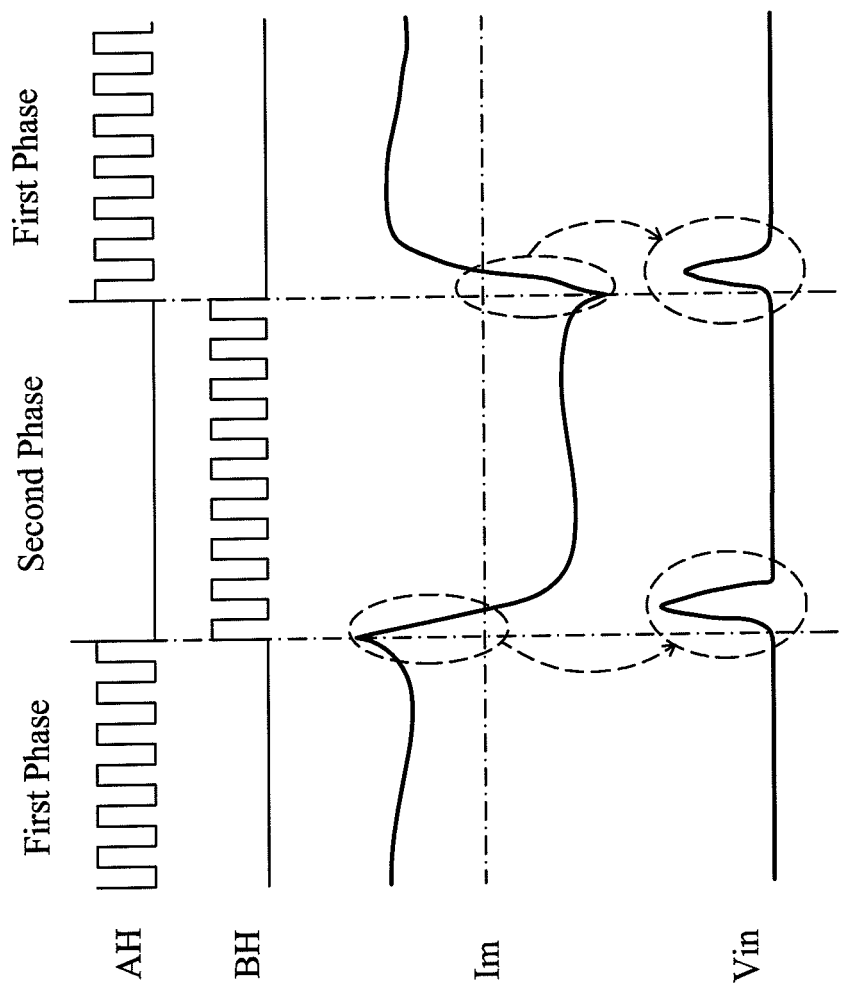
FIG. 3 is a waveform diagram of phase-change surge currents of a BLDC motor during phase changes.
Figure 4:
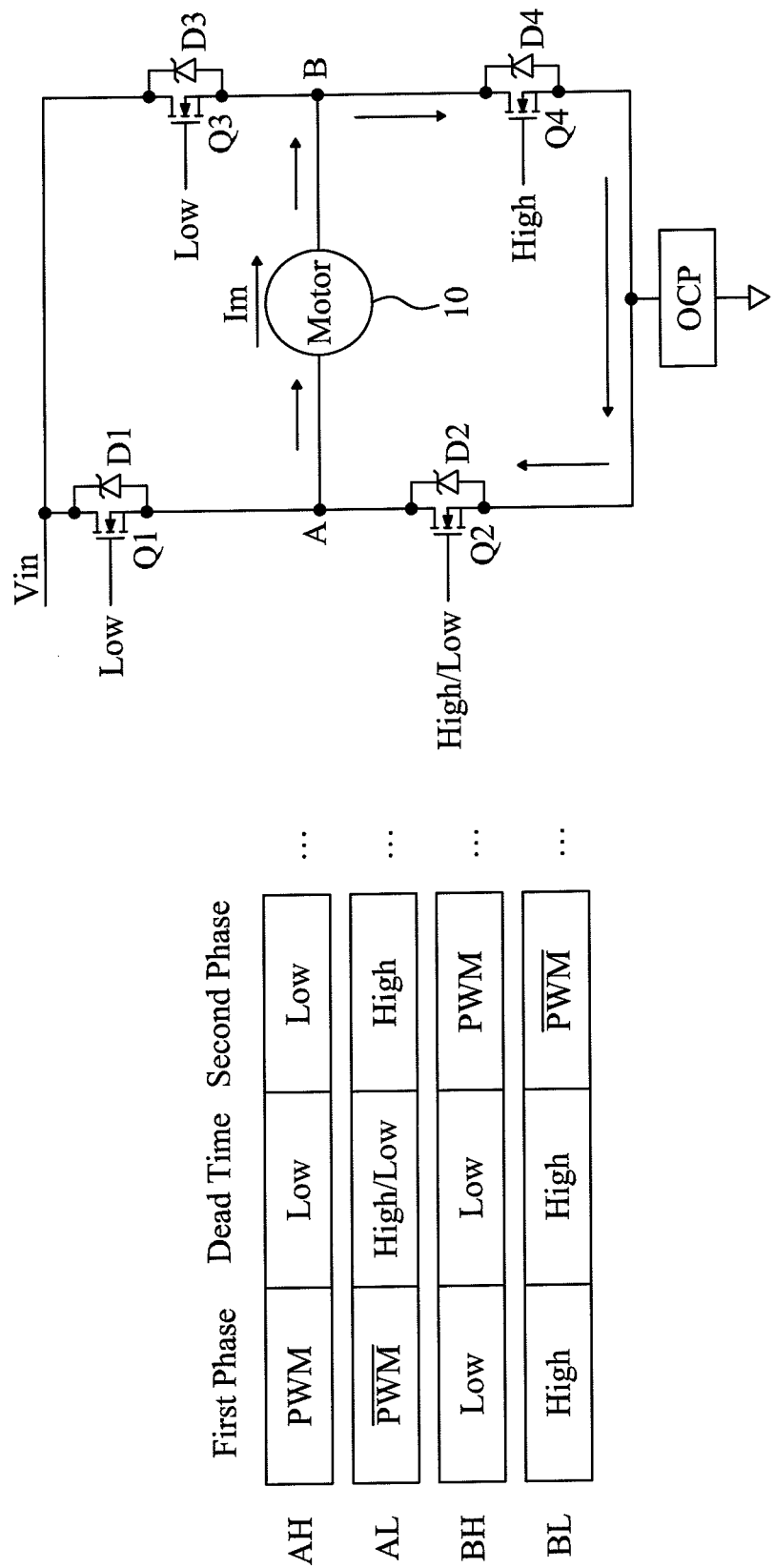
FIG. 4 is a diagram showing a dead time that is conventionally inserted when a BLDC motor is switched between two phases.
Figure 6:
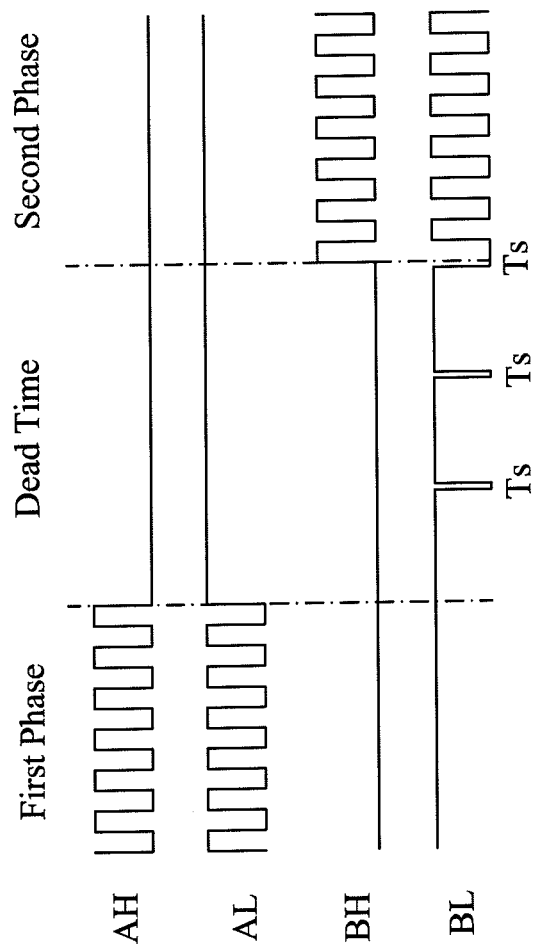
FIG. 6 is a waveform diagram of the circuit shown in FIG. 5 during a phase change.

In the embodiment shown in FIG. 5, the current detector 16 includes a resistor R connected between the H-bridge circuit and a ground terminal, and comparators 18 and 20 to compare the voltage V_R across the resistor R to thresholds V_ZCD and V_OCP, respectively, to determine control signals S1 and S2 for the PWM controller 12. This embodiment integrates the apparatus for dynamically adjusting the dead time of the BLDC motor 10 during a phase change into the existing OCP circuit. Similar to prior arts, the threshold V_OCP represents a setting value of over-current protection, and when V_R≥V_OCP, the signal S2 is asserted so that the PWM controller 12 will stop providing the PWM signals or directly turn off the lower-side MOSFETs Q2 and Q4, thereby stopping the BLDC motor 10. For switching from the first phase to the second phase, alike the mentioned prior art, during the dead time, the PWM controller 12 maintains the MOSFETs Q1-Q3 off and the MOSFET Q4 on, to establish a current loop as shown in FIG. 4 for consuming the winding current Im. Additionally, however, for dynamically adjusting the dead time, the PWM controller 12 temporarily turns off the MOSFET Q4 during the dead time, which will make the current Im flow to a power input terminal Vin from the output terminal B through the body diode D3 of the MOSFET Q3, and flow to the body diode D2 of the MOSFET Q2 from the ground terminal through the resistor R, so that a negative detection voltage is generated at the detection node V_R, by which the winding current Im during the dead time is detected. Various approaches may be used for temporarily turning off the MOSFET Q4. For example, the PWM controller 12 may apply a short pulse to the gate of the MOSFET Q4. Preferably, as shown in FIG. 6, a short pulse Ts is sent to the gate of the MOSFET Q4 at regular time intervals. In another embodiment, during each short pulse Ts, the MOSFET Q3 is turned on during the time interval of temporarily turning off the MOSFET Q4, to allow the current Im to flow therethrough. Since the embodiment shown in FIG. 5 detects the winding current Im by detecting the detection voltage V_R, a zero-voltage threshold V_ZCD corresponding to the zero-current threshold is set for the comparator 18. Preferably, the zero-voltage threshold V_ZCD is set with a value slightly smaller than zero. During the short pulse Ts, when V_R≥V_ZCD, the signal S1 is asserted and indicates that the winding current Im is substantially or close to zero, and according thereto, the PWM controller 12 may start to operate the BLDC motor 10 with the second phase.

Since the dead time is dynamically adjusted and independent of the rotation speed, the disclosed method and apparatus are suitable for use at different rotation speeds.

Generally, the PWM controller of the conventional driving circuit of a BLDC motor has a shortest pulse setting for defining the minimum on time or the minimum off time of the PWM signal. This shortest pulse may be used to generate the disclosed short pulse Ts for detection of the winding current Im. For example, referring to FIG. 7, for the first phase, the PWM controller 12 maintains the MOSFET Q3 off and the MOSFET Q4 on, and determines the duty cycle of the PWM signal according to the required rotation speed for switching the MOSFETs Q1 and Q2. For the dead time, the PWM controller 12 maintains the MOSFETs Q1-Q3 off, and uses the PWM signal with the minimum off time to control the MOSFET Q4; while terminating the dead time once detecting the winding current Im equal to or smaller than the zero-current threshold. For the second phase, the PWM controller 12 maintains the MOSFET Q1 off and the MOSFET Q2 on, and determines the duty cycle of the PWM signal according to the required rotation speed for switching the MOSFETs Q3 and Q4. Alternatively, during the dead time, the MOSFET Q3 may be maintained on to allow the current Im to flow therethrough, and thus, in another embodiment as shown in FIG. 8, during the dead time, the PWM signal with the minimum on time is used to control the MOSFET Q3, and the PWM signal with the minimum off time is used to control the MOSFET Q4.

As illustrated by the embodiment shown in FIG. 5, according to the present invention, only a simple circuit is enough to dynamically adjust the dead time, and moreover, the simple circuit can be incorporated into an existing OCP circuit. In other embodiments, the current detector 16 may be realized by different circuits.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the method comprising:
   A.) during the dead time, turning on the second lower-side switch while turning off the other switches, or turning on the first and the second lower-side switches while turning off the other switches, for consuming a winding current of the brushless direct-current motor;
   B.) detecting the winding current during the dead time; and
   C.) terminating the dead time once the winding current is detected equal to or smaller than a zero-current threshold;
   wherein the step B comprises temporarily turning off the second lower-side switch for the winding current to be detected.

2. The method of claim 1, wherein the step B further comprises turning on the second upper-side switch during a time interval of temporarily turning off the second lower-side switch.

3. The method of claim 1, wherein the step C comprises:
   generating a detection voltage depending on the winding current;
   comparing the detection voltage to a zero-voltage threshold; and
   asserting a control signal for terminating the dead time when the detection voltage is equal to or greater than the zero-voltage threshold.

4. A method for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the method comprising:
   A.) during the dead time, turning on the second lower-side switch while turning off the other switches, or turning on the first and the second lower-side switches while turning off the other switches, for consuming a winding current of the brushless direct-current motor;
   B.) detecting the winding current during the dead time; and
   C.) terminating the dead time once the winding current is detected equal to or smaller than a zero-current threshold;
   wherein the step B comprises temporarily turning off the second lower-side switch at regular time intervals for the winding current to be detected.

5. The method of claim 4, wherein the step B further comprises turning on the second upper-side switch during a time interval of temporarily turning off the second lower-side switch.

6. The method of claim 4, wherein the step C comprises:
   generating a detection voltage depending on the winding current;
   comparing the detection voltage to a zero-voltage threshold; and
   asserting a control signal for terminating the dead time when the detection voltage is equal to or greater than the zero-voltage threshold.

7. An apparatus for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the apparatus comprising:
   a PWM controller connected to the H-bridge circuit, operative to control the switches such that during the dead time, the second lower-side switch is turned on while the other switches are turned off, or the first and the second lower-side switches are turned on while the other switches are turned off, for consuming a winding current of the brushless direct-current motor; and
   a current detector connected to the H-bridge circuit and the PWM controller, detecting the winding current during the dead time for signaling the PWM controller to terminate the dead time once the winding current is detected to be equal to or smaller than a zero-current threshold;
   wherein the PWM controller, during the dead time, applies a short pulse to a control terminal of the second lower-side switch for temporarily turning off the second lower-side switch, thereby allowing the current detector to detect the winding current.

8. The apparatus of claim 7, wherein the current detector comprises:
   a resistor connected between the H-bridge circuit and a ground terminal, generating a detection voltage depending on the winding current when the current detector detects the winding current; and
   a comparator connected to the resistor and the PWM controller, comparing the detection voltage to a zero-voltage threshold for asserting a control signal for the PWM controller.

9. The apparatus of claim 7, wherein the zero-current threshold is substantially zero or a positive value close to zero.

10. The apparatus of claim 8, wherein the zero-voltage threshold is substantially zero or a negative value close to zero.

11. An apparatus for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the apparatus comprising:
a PWM controller connected to the H-bridge circuit, operative to control the switches such that during the dead time, the second lower-side switch is turned on while the other switches are turned off, or the first and the second lower-side switches are turned on while the other switches are turned off, for consuming a winding current of the brushless direct-current motor; and
a current detector connected to the H-bridge circuit and the PWM controller, detecting the winding current during the dead time for signaling the PWM controller to terminate the dead time once the winding current is detected to be equal to or smaller than a zero-current threshold;
wherein the PWM controller, during the dead time, applies a short pulse to a control terminal of the second upper-side switch and to a control terminal of the second lower-side switch, for temporarily turning the second lower-side switch off and the second upper-side switch on, thereby allowing the current detector to detect the winding current.

12. The apparatus of claim 11, wherein the current detector comprises:
a resistor connected between the H-bridge circuit and a ground terminal, generating a detection voltage depending on the winding current when the current detector detects the winding current; and
a comparator connected to the resistor and the PWM controller, comparing the detection voltage to a zero-voltage threshold for asserting a control signal for the PWM controller.

13. The apparatus of claim 11, wherein the zero-current threshold is substantially zero or a positive value close to zero.

14. The apparatus of claim 12, wherein the zero-voltage threshold is substantially zero or a negative value close to zero.

15. An apparatus for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the apparatus comprising:
a PWM controller connected to the H-bridge circuit, operative to control the switches such that during the dead time, the second lower-side switch is turned on while the other switches are turned off, or the first and the second lower-side switches are turned on while the other switches are turned off, for consuming a winding current of the brushless direct-current motor; and
a current detector connected to the H-bridge circuit and the PWM controller, detecting the winding current during the dead time for signaling the PWM controller to terminate the dead time once the winding current is detected to be equal to or smaller than a zero-current threshold;
wherein the PWM controller, during the dead time, applies a short pulse to a control terminal of the second lower-side switch at regular time intervals for temporarily turning off the second lower-side switch, thereby allowing the current detector to detect the winding current.

16. The apparatus of claim 15, wherein the current detector comprises:
a resistor connected between the H-bridge circuit and a ground terminal, generating a detection voltage depending on the winding current when the current detector detects the winding current; and
a comparator connected to the resistor and the PWM controller, comparing the detection voltage to a zero-voltage threshold for asserting a control signal for the PWM controller.

17. The apparatus of claim 15, wherein the zero-current threshold is substantially zero or a positive value close to zero.

18. The apparatus of claim 16, wherein the zero-voltage threshold is substantially zero or a negative value close to zero.

19. An apparatus for dynamically adjusting a dead time of a brushless direct-current motor during a phase change, wherein the brushless direct-current motor is connected between two output terminals of an H-bridge circuit that is established by a first upper-side switch, a first lower-side switch, a second upper-side switch, and a second lower-side switch, the apparatus comprising:
a PWM controller connected to the H-bridge circuit, operative to control the switches such that during the dead time, the second lower-side switch is turned on while the other switches are turned off, or the first and the second lower-side switches are turned on while the other switches are turned off, for consuming a winding current of the brushless direct-current motor; and
a current detector connected to the H-bridge circuit and the PWM controller, detecting the winding current during the dead time for signaling the PWM controller to terminate the dead time once the winding current is detected to be equal to or smaller than a zero-current threshold;
wherein the PWM controller, during the dead time, applies a short pulse to a control terminal of the second upper-side switch and to a control terminal of the second lower-side switch at regular time intervals, for temporarily turning the second lower-side switch off and the second upper-side switch on, thereby allowing the current detector to detect the winding current.

20. The apparatus of claim 19, wherein the current detector comprises:
a resistor connected between the H-bridge circuit and a ground terminal, generating a detection voltage depending on the winding current when the current detector detects the winding current; and
a comparator connected to the resistor and the PWM controller, comparing the detection voltage to a zero-voltage threshold for asserting a control signal for the PWM controller.

21. The apparatus of claim 19, wherein the zero-current threshold is substantially zero or a positive value close to zero.

22. The apparatus of claim 20, wherein the zero-voltage threshold is substantially zero or a negative value close to zero.

* * * * *